United States Patent [19]

Helfman

[11] Patent Number: 4,698,936
[45] Date of Patent: Oct. 13, 1987

[54] PARTITION WALL PLANTER

[76] Inventor: Barbara Helfman, 120 S. Verity Pkwy., Middletown, Ohio 45044

[21] Appl. No.: 783,488

[22] Filed: Oct. 3, 1985

[51] Int. Cl.⁴ .............................................. A01G 9/02
[52] U.S. Cl. ........................................... 47/68; 47/40
[58] Field of Search ............... 47/68, 39, 40, 66, 41.1, 47/41.11, 79; 248/214, 311.2, 208; 220/3.9, 3.92

[56] References Cited

U.S. PATENT DOCUMENTS

| 1,751,344 | 3/1930 | Mason | 47/68 |
| 1,852,650 | 4/1932 | Halberstadter | 248/311.2 |
| 2,614,471 | 10/1952 | Markowitz | 248/214 |
| 3,272,372 | 9/1966 | Ericson | 220/3.9 |
| 3,588,019 | 6/1971 | Cozeck | 220/3.9 |
| 3,871,144 | 3/1975 | Rudin . | |
| 4,048,754 | 9/1977 | Laux | 47/68 |
| 4,492,499 | 1/1985 | Gasper | 248/214 |

FOREIGN PATENT DOCUMENTS

| 348814 | 3/1979 | Austria . | |
| 7635182 | 4/1977 | Fed. Rep. of Germany . | |
| 7723426 | 8/1977 | Fed. Rep. of Germany . | |
| 2920155 | 11/1980 | Fed. Rep. of Germany | 47/68 |
| 81264607 | 4/1982 | Fed. Rep. of Germany . | |
| 7319282 | 2/1974 | France . | |
| 7603125 | 2/1977 | France . | |
| 8201142 | of 1983 | France . | |
| 8115237 | 4/1983 | France . | |

*Primary Examiner*—Robert A. Hafer
*Assistant Examiner*—Bradley M. Lewis
*Attorney, Agent, or Firm*—Frost & Jacobs

[57] ABSTRACT

A planter designed to be mounted upon the top of a wall partition typically found in an open plan modern office, wherein wall partition includes a horizontal surface terminating in two parallel vertical surfaces. The container has a bottom and a continuous side wall forming an unobstructed open interior. Support brackets, having a generally horizontal leg and a generally vertical leg, includes means to permit the support bracket to be secured to said container. Means to fasten said support bracket to said container, and said container and support bracket to said wall partition, such that said generally vertically depending legs of said support brackets tightly clamp said two parallel vertical surfaces of said wall partition, includes one or more screw threaded studs and mating nuts.

13 Claims, 8 Drawing Figures

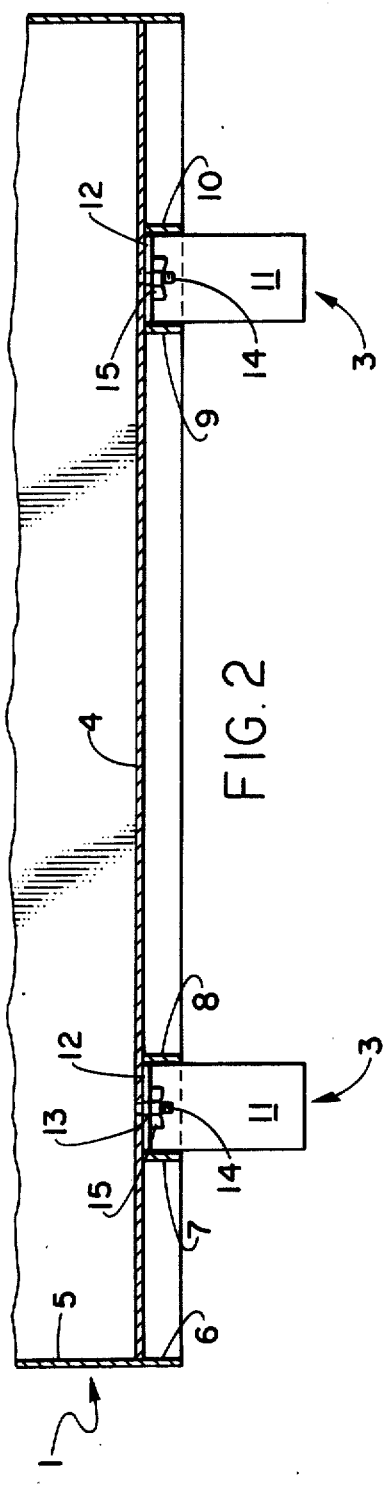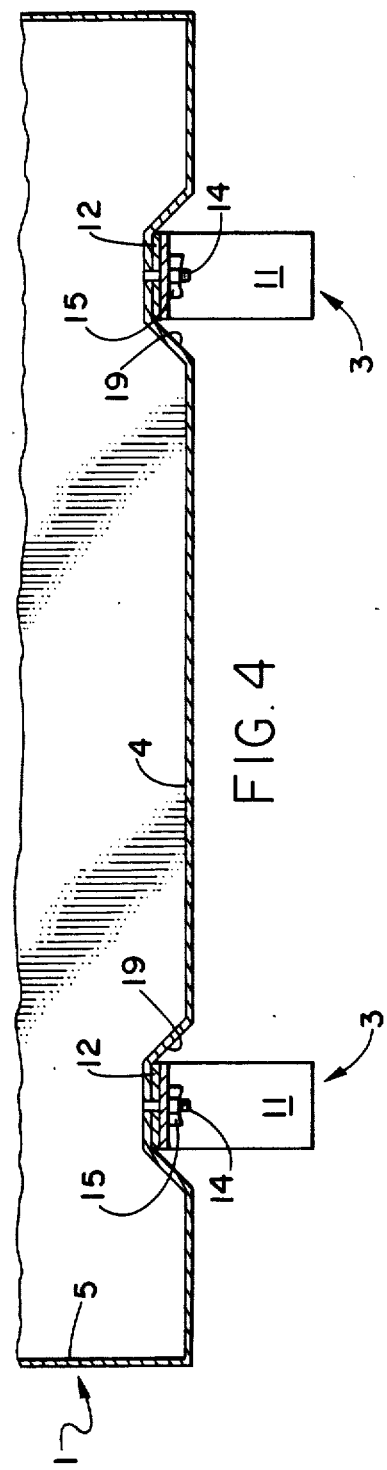

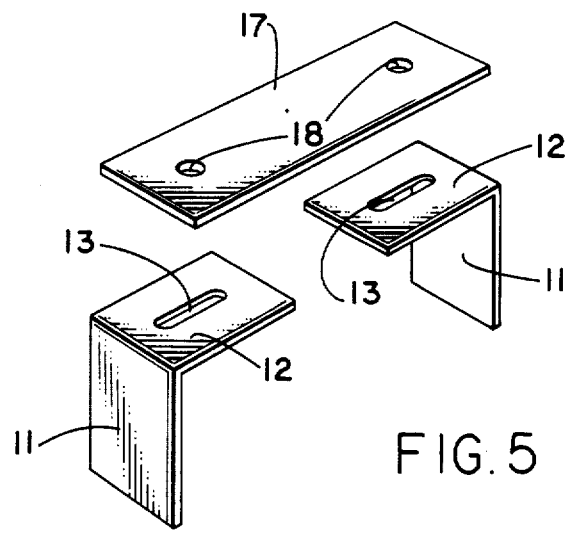
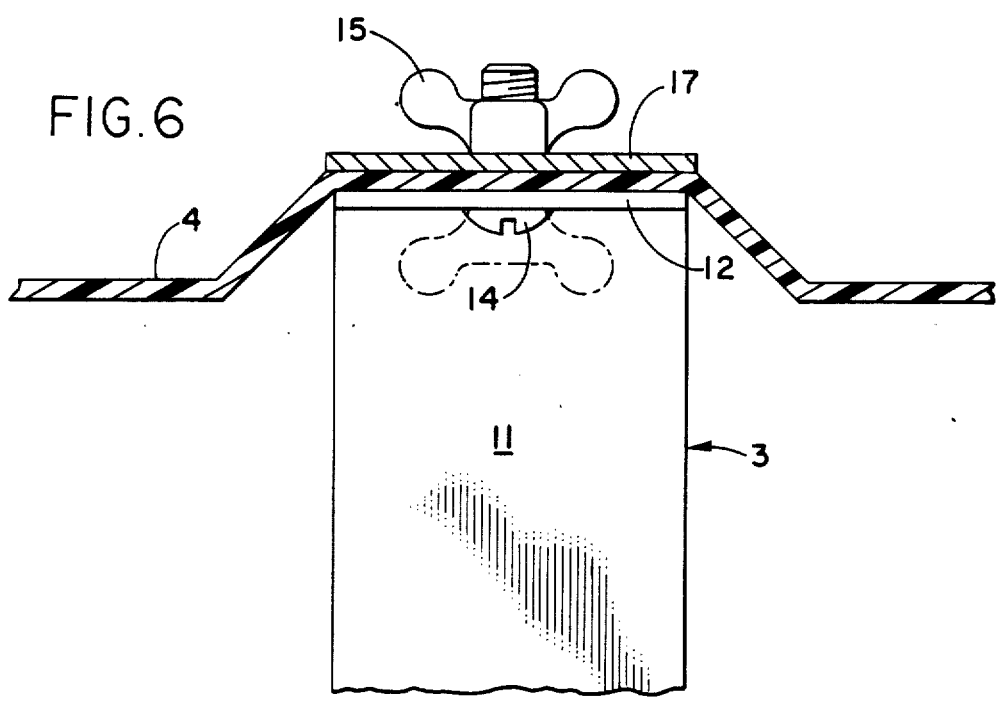

PARTITION WALL PLANTER

BACKGROUND OF THE INVENTION

1. Field of the Invention.

The present invention relates to containers for plants and other decorative objects. In particular, the present invention relates to containers capable of being mounted upon top of wall partitions such as those frequently employed in open plan offices. The invention will be specifically disclosed in connection with a longitudinal type planter having studs projecting from the bottom surface thereof, said studs adapted to secure a pair of adjustable brackets, each planter being provided with two pairs of the brackets at each end thereof. The planter is secured to the wall partition by means of the adjustable brackets. In this manner, the plants are capable of supporting and containing plants or other decorative objects upon top of the wall partition so as to present an aesthetically pleasing surrounding for open plan offices.

2. Prior Art.

Modern offices are frequently created by employing wall partitions which partially extend upwardly from the floor toward the ceiling. This system permits the application of large heating and cooling zones, overall uniform lighting for each individual office or work station, and more efficiently utilizes all of the available floor space. Generally, open plan type individual offices are designed to accommodate a desk, chair, filing cabinet or other storage cabinet and a plurality of storage bins attached to the vertical wall of the partition. Consequently, each individual office or work station has no space for personal decorative objects and/or plants. Most plants in open plan type offices are located in hall corners, for example, but are too few in number to present a warm, friendly and personal atmosphere.

U.S. Pat. No. 4,015,543 to Stankowitz discloses a support bracket designed to be mounted between and supported by wall partitions. The support bracket projects perpendicularly from the wall partitions and is designed to be secured by the fasteners which join wall partitions together. The support bracket cradles a mating octagonal saucer, upon which plants and other decorative objects may be placed. These objects project a specific distance from the partition walls in much the same manner as the plurality of storage bins conventionally associated with open plan type individual offices or work stations. In other words, the support bracket and octagonal saucer merely serves to make crowded conditions worse since they occupy space within the partition walls which form the individual office. Lastly, the support bracket and octagonal saucer are capable of supporting light objects or lightweight small plants. Heavy plants, which are generally larger in size, could not be supported by the bracket and saucer. Because the support bracket and octagonal saucer substantially project into the work station, and because typical individual offices or work stations are compact, thus lacking additional unused space, a need exists for a planter which maximizes space within each work station and yet permits the employee to personalize the work station with objects or plants so as to create a warm, friendly, personal atmosphere within the individual office or work station.

SUMMARY OF THE INVENTION

It is a primary object of the present invention to provide a container or planter which may be adjustably mounted on top of wall partitions and be adjustable so as to fit a variety of widths of wall partitions.

It is another object of the present invention to provide a planter which is sufficiently simple in construction so that it may be assembled and disassembled by the average office employee, without having to use tools.

A still further object of the present invention is to provide a planter designed to be mounted on top of a wall partition.

To achieve the foregoing and other objects, in accordance with the purpose of the present invention as described herein, a container is provided which is adapted to be mounted upon a partition wall. The container includes a longitudinal box-type planter having a bottom surface and a continuous side wall forming an unobstructed interior. Each longitudinal end of the planter includes one or more vertically positioned screw threaded studs and a corresponding nut, such as a wing nut, for securing a pair of adjustable plant brackets thereon. The adjustable brackets are adapted to secure the planter firmly to the top of a wall partition, the brackets being adjustable to accommodate various widths of the wall partition.

According to a specific aspect of the invention, the screw threaded studs may be integrally formed with the bottom surface of the planter container, or the studs may be integrally formed with a plate adapted to be secured to the bottom of the planter container by welding, by adhesives, or the like.

According to a another specific aspect of the invention, the bottom surface of the planter container includes recessed portions and said screw threaded studs are integrally attached to said planter container in the recessed portion. A plate having integrally formed screw threaded studs attached thereto is secured to the planter, in each recessed portion. Each recessed portion is designed to be sufficiently recessed so as to accommodate the thickness of the brackets and the length of the screw threaded stud.

In another specific aspect of the present invention, a screw threaded bolt secures one or more support brackets to the bottom of the planter or container by projecting through a hole into the interior of the planter. In this embodiment, a sealing means, such as a rubber washer, may be employed in order to prevent water and soil from escaping from the interior of the planter container.

In the broadest sense, the present invention includes an elongated container having a bottom surface and a continuous side wall surface forming an unobstructed open interior, at least a pair of screw threaded studs spaced from one another and positioned at each longitudinal end of the container, a pair of brackets positioned at each longitudinal end of the container and adapted to be secured to the container by one or more of the screw threaded studs, at least one of the brackets of each pair of brackets being adjustable so that the distance between each bracket of the pair of brackets may be varied.

Still other objects of the present invention will become apparent to those skilled in the art from the following description wherein there is shown and described a preferred embodiment of the present invention, simply by way of illustration, of one of the best modes contemplated for carrying out the invention. As will be realized, the invention is capable of other different embodiments, and its several details are capable of modification in various, obvious aspects without departing from the invention. Accordingly, the drawings and the descriptions will be regarded as illustrative in nature and not as restrictive.

BRIEF DESCRIPTION OF THE DRAWINGS

The accompanying drawings incorporated in and forming a part of the specification illustrate several aspects of the present invention, and, together with a description, serve to explain the principles of the invention.

In the drawings:

FIG. 2 is a longitudinal cross-sectional side view of one embodiment of the present invention illustrating the container of FIG. 1 with the wall partition removed in order to further clarify and illustrate the embodiment;

FIG. 4 is a longitudinal cross-sectional side view of the planter of FIG. 3 with the wall partition being removed for clarification purposes;

FIG. 5 is a perspective view of a pair of brackets and a support plate;

FIG. 6 is a fragmentary cross-sectional side view of the support bracket and plate of FIG. 5 being positioned on a planter;

DETAILED DESCRIPTION OF THE PREFERRED EMBODIMENTS

The planters of the present invention are designed to be mounted upon top of a wall partition such as is normally found in open plan type modern offices. The planters may be any shape, but the preferred shape is an elongated rectangular shape as illustrated in FIGS. 1-4 and 7. The specific sizes of the planters may vary, however, planters that are 30 or 36 inches long, approximately 6 inches wide and approximately 6½ to 7 inches tall are found to be most satisfactory. The planters generally have an unobstructed interior for containing soil, plants, other containers having plants therein, or decorative objects.

The planter may be made of any conventional material such as metal, plastic, synthetic resin or wood. If metal is employed, preferably a non-oxidizing metal such as stainless steel, bronze, copper, aluminum, or brass is used. If plastic is employed, molded or die cast plastics are preferred, such as ABS, acrylic, polystyene, polyethylene, polyvinylchloride, polytetrafluorethylene (teflon), polymethyl methacrylate (plexiglass or lucite), polypropylene, polycarbonate, or the like are preferred. Of course, plastics can include color pigments, fire retardents, gloss agents, etc., as is well known to those skilled in the art. If synthetic resins are employed, such resins as nylon, rayon, dacron, formica, fiberglass, polyester, phenol formaldehyde, phenolfurfural, urea formaldehyde, and the like. If wood is employed, preferably the wood is treated or coated, for example, with paint or plastic, to prevent rot and to retain moisture for the plants. Additionally, a wood veneer or a paper or fabric covering could be employed on a planter which is made of metal, plastic, synthetic resin or the like.

Figure 1:
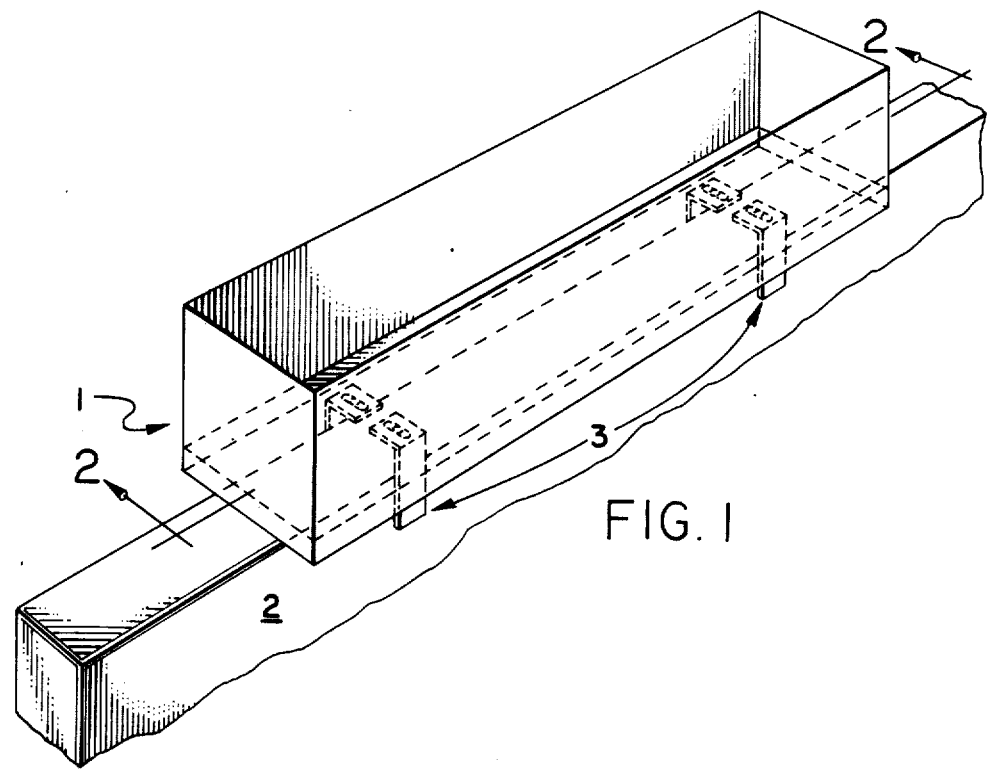
FIG. 1 is a perspective environmental view illustrating the planter mounted upon top of a wall partition.

FIG. 1 illustrates planter container 1 mounted upon a partition wall 2 by means of at least two pair of brackets 3. The specific details of this container are more fully illustrated in FIG. 2.

The container 1, illustrated in FIG. 2, has a flat bottom 4 and a continuous side wall 5 (shown in cross-section) which forms an unobstructed open interior. In the specific embodiment illustrated in FIG. 2, the side wall 5 extends downwardly past the bottom surface 4 a substantial distance to define a peripheral skirt 6.

Four parallel walls 7, 8 and 9, 10 extend across the width of the container and are perpendicularly attached integrally or non-integrally to the lower surface of the bottom 4 of the container and to the peripheral skirt 6. The parallel walls are grouped into two pairs such that walls 7 and 8 are positioned adjacent one longitudinal end of the container, while parallel walls 9 and 10 are positioned adjacent the opposite longitudinal end of the container. Each pair 7, 8 and 9, 10 of the parallel walls are spaced from one another a distance slightly greater than the width of a bracket 3. This arrangement of the parallel walls along with the skirt 6, forms two recessed areas defined by parallel walls 7 and 8 and the peripheral skirt 6 and parallel walls 9 and 10 along with the peripheral skirt 6.

The brackets 3, as illustrated in FIG. 2, are L-shaped and have a vertically downwardly depending leg 11 and a horizontally depending leg 12. The horizontal leg 12 includes an elongated slot 13, as shown in FIG. 5, designed to accommodate a screw threaded stud or bolt 14.

As illustrated in FIG. 2, the screw threaded stud 14 is securely fastened at one end thereof to the bottom surface 4 such that it projects vertically downward a distance which does not exceed the height of the peripheral skirt 6. A fastener 15, such as a wing nut, is designed to secure one or more of the L-shaped brackets 3 to the container 1 by extending the stud 14 through the elongated slot 13 and tightening the wing nut on the stud.

Figure 8:
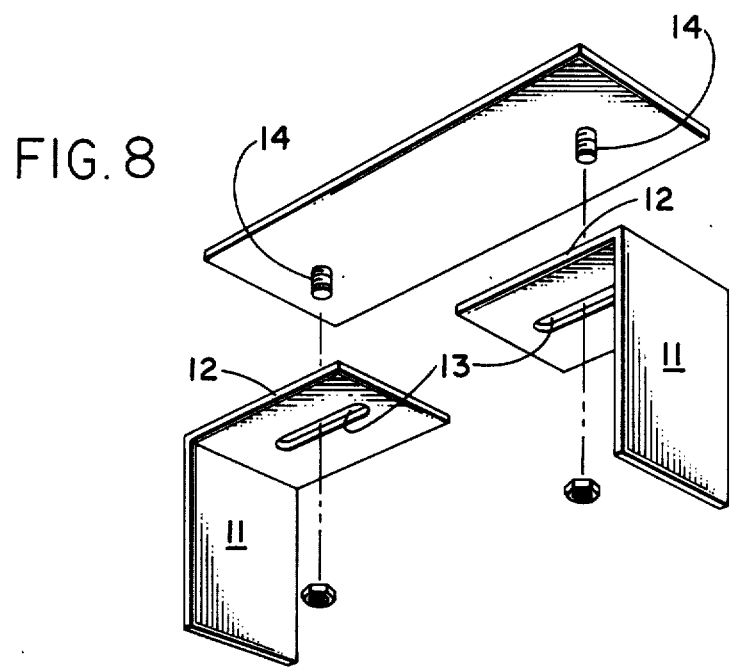
FIG. 8 is a perspective view of another embodiment illustrating a different type of support plate with a pair of support brackets.

The container 1, illustrated in FIG. 2, could optionally secure the brackets 3 by fastening a support plate 16, as illustrated in FIG. 8, within the recess created by parallel walls 7, 8 and the peripheral skirt 6. Likewise, another support plate 16 could be securely fastened within the recess created by parallel walls 9, 10 and the peripheral skirt 6. The support plate 16 could be secured within the recess to the bottom 4 by welding, brazing, using an adhesive, or the like. As illustrated in FIG. 8, support plate 16 has two downwardly projecting integrally formed screw threaded studs 14. The screw threaded studs 14 on support plate 16 are of a length which does not extend beyond the lower peripheral edge of the peripheral skirt 6. Optionally, the support plate 16, illustrated in FIG. 8, could include only one downwardly projecting screw threaded stud 14. In this embodiment, the horizontal leg 12 of each of the support brackets 3 would be of a sufficient length and have an elongated opening 13 of sufficient length such that the single downwardly projecting threaded screw stud would project through both brackets and secure each to the container 1 with a wing nut, for example.

The container 1, illustrated in FIG. 2, could also secure the brackets 3 by means of the support plate 17, illustrated in FIGS. 5 and 6. The support plate 17 has at least one, and preferably two circular openings 18. Circular openings 18 mate with corresponding openings (not shown) in the bottom 4 of a container 1. The openings in the bottom 4 would extend from the inside of the container to the inside of the recess created by parallel walls 7 and 8 and the peripheral skirt 6. Likewise, additional openings would also communicate from the interior of the container 1 to the interior of the recess formed by parallel walls 9, 10 and the peripheral skirt 6. The support plate 17 would be positioned on the inside of container 1 such that the circular openings 18 mate with the circular openings in container 1. The brackets 3 would then be secured to the container 1 and the support plate 17 by means of a screw threaded bolt and a wing nut, for example, as is illustrated in FIG. 6 with respect to another embodiment of the present invention. Of course, whether the stud projects upwardly so that the wing nut is within the container 1, or the screw threaded bolt projects downwardly such that the wing nut is within the recess, in much the same fashion as is illustrated in FIG. 2, would be well within the ambit of the present invention.

Figure 3:
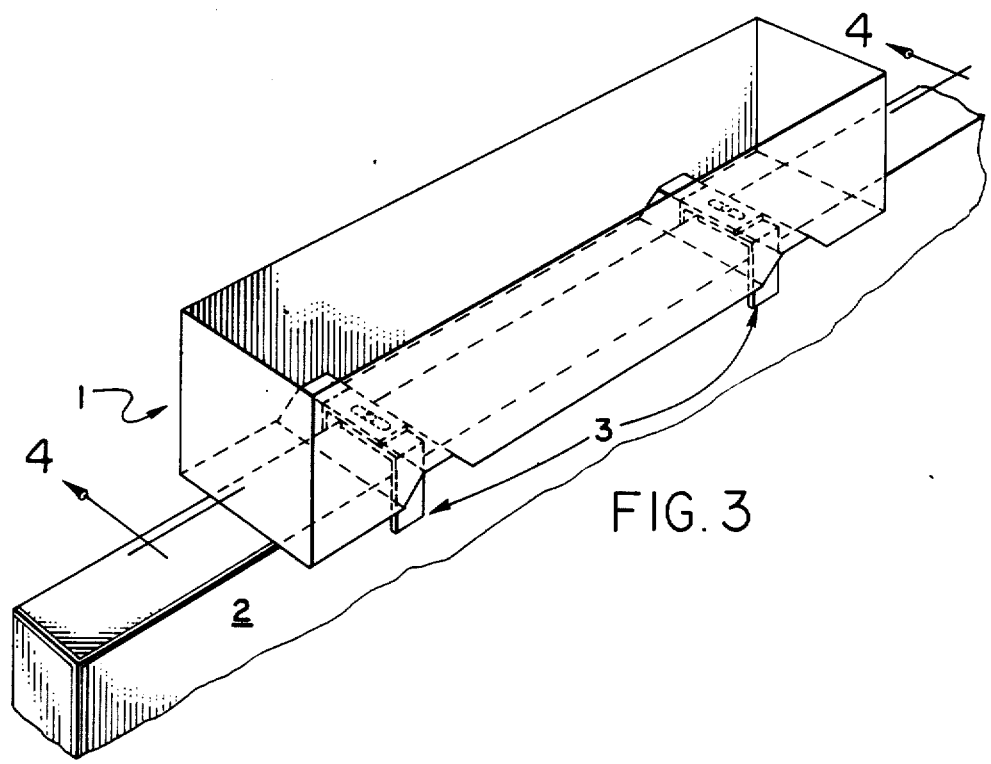
FIG. 3 is a perspective environmental view of another embodiment of the present invention illustrating a planter mounted upon top of a wall partition.

FIG. 3 illustrates a further embodiment of the container 1 of the present invention. This container is also designed to be positioned upon top of a partition wall 2 by means of brackets 3. The specific features of this container are more fully illustrated in FIG. 4.

A longitudinal cross-sectional side view of the container 1 illustrated in FIG. 3, is shown in FIG. 4. This container has a bottom 4, a continuous side wall 5 which forms an open unobstructed interior. This container does not include a peripheral skirt nor parallel partitions extending between the peripheral skirt. The bottom 4 of the container has upwardly projecting recesses 19 which extends across the width of the container 1. Each longitudinal end of the container includes at least one such recess. Extending downwardly from the recess 19 is at least one and preferably two threaded studs 14 which are integrally or non-integrally secured to the bottom 4 of container 1.

In each recess 19 is a pair of support brackets 3, only one of which is shown in FIG. 4. Each support bracket has a vertically downwardly depending leg 11 and a horizontally depending leg 12 with an elongated opening 13 therein, as was described previously and illustrated in FIG. 5.

If only one downwardly projecting threaded stud 14 is employed in each recess 19, then the horizontal legs of each support bracket 3 must be of a sufficient length so that the studs project through each elongated opening 13 of the pair of support brackets. The support brackets are securely fastened to the planter container 1 by means of a wing nut 15, for example. When a pair of downwardly projecting threaded screw studs 14 are employed within each recess 19, then each support bracket 3 would be secured to the planter by means of one of the downwardly projecting studs 14 and a wing nut 15.

With the embodiment described and illustrated in FIGS. 3 and 4, it is apparent that the container 1 rests upon the top wall of partition 2 in such a fashion that the outer surface of the bottom 4 of container 1 contacts the top surface of the wall partition, except where recesses 19 are located.

In a further embodiment of the present invention, the container 1 illustrated in FIG. 3, could be secured to the wall partition 2 by the horizontal brackets 3 in a manner illustrated in FIG. 8. In other words, the support plate 16 in FIG. 8 could be secured to the recess 19 by means of welding, brazing, adhesives, or the like, such that the threaded studs 14 project downwardly when the container 1 is positioned upon the top of a wall partition 2. In such an embodiment, the support plate would provide additional strength to the planter 1 in the area where the planter is being supported by the brackets 3.

Figure 7:
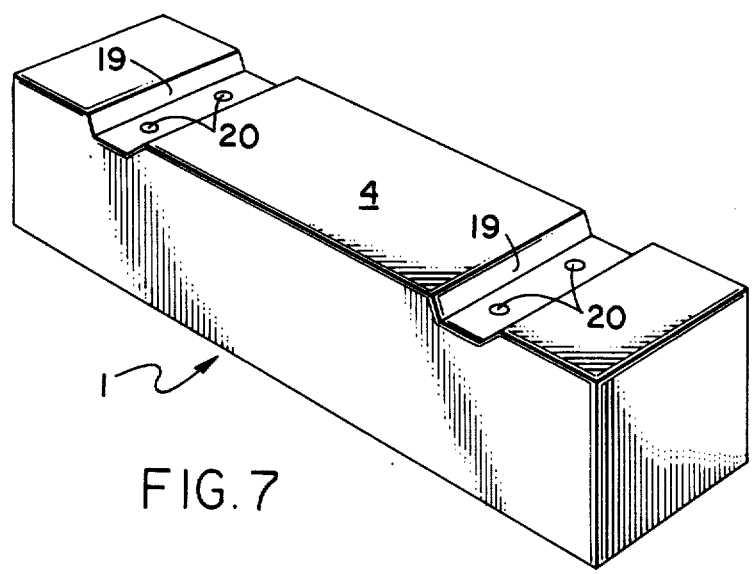
FIG. 7 is a perspective bottom view of another embodiment illustrating a planter.

In another embodiment, the container 1 illustrated in FIG. 3 may be secured to the wall partition by the method illustrated in FIGS. 5-7.

As stated previously, support plate 17 would be positioned on the inside of container 1 and each recess 19 would include one and preferably two circular openings 20 which would mate with the circular openings 18 in support plate 17. In this embodiment, a screw threaded bolt 14 would project through each circular opening 18 of support plate 17 and through the mating circular openings 20 in recess 19, and extend through the elongated opening 13 in the horizontal leg 12. A wing nut 15 would firmly secure the support plate, planter container 1 and support bracket 3 to one another. As stated previously, whether the screw threaded bolt 14 extends upwardly such that wing nut 15 is within container 1, or extends downwardly such that the wing nut 15 is within recess 19, is well within the ambit invention.

Generally, the support brackets 3, support plates 16,17 screw threaded studs or bolts 14 and wing nuts 15 are made from the same material as container planter 1. However, it is contemplated that the present invention would include containers being made from one material, for example plastic, while the support brackets, support plate, etc. are formed from another material. Preferably, the support plate 16,17 and the screw threaded studs or bolts 14, along with the wing nuts 15 would be formed of metal, regardless with what material the brackets 3 and the container 1 are formed.

Modification may be made in the invention without departing from the spirit of it.

What is claimed is:

1. A planter designed to be mounted upon top of a wall partition having a horizontal surface terminating in two parallel vertical surfaces comprising:

a leak-proof container having a bottom and a continuous side wall forming an unobstructed open interior;

at least one support bracket having a generally horizontal leg and a generally vertical leg, said horizontal leg having means by which said support bracket can be secured to said container;

means to fasten said container to said support bracket and to clamp said two parallel vertical surfaces of said wall partition tightly between said vertically depending legs of said support brackets, wherein said continuous side wall extends below said bottom of said container to form a peripheral skirt of sufficient height to hide said fastening means when said container is mounted upon top of said wall partition; and a plurality of parallel partition walls, extending across the width of said container, said parallel partition walls and said peripheral skirt forming at least two recesses.

2. The planter of claim 1, wherein said means to fasten includes a plurality of screw threaded studs integrally formed with said recesses, including a corresponding wing nut to secure said support brackets to said container.

3. The planter of claim 1, wherein said means to fasten includes support plates secured within said recesses, each support plate having at least one downwardly projecting screw threaded stud and a corresponding wing nut.

4. The planter of claim 1, wherein said means to fasten includes a support plate having at least one opening and positioned within said unobstructed interior of said container, a bolt and mating nut having sufficient length to project through said support plate and container and support bracket, thereby serving to secure said support bracket, support plate and container to one another.

5. A planter designed to be mounted upon top of a wall partition having a horizontal surface terminating in two parallel vertical surfaces comprising:
- a leak-proof container having a bottom and a continuous side wall forming an unobstructed open interior;
- at least one support bracket having a generally horizontal leg and a generally vertical leg, said horizontal leg having means by which said support bracket can be secured to said container;
- means to fasten said container to said support bracket and to clamp said two parallel vertical surfaces of said wall partition tightly between said vertically depending legs of said support brackets, and
- a pair of recesses on said bottom surface of said container so that said container sets flatly upon said wall partition except for said recesses, said recesses extending across the entire width of said container.

6. The planter of claim 5, wherein said means to fasten includes at least one integrally formed screw threaded stud in each of said recesses, including a corresponding wing nut to secure said support brackets to said container and to secure said container and support brackets to said partition wall.

7. The planter of claim 5, wherein said means to fasten includes a support plate secured within each of said recesses and having at least one downwardly projecting screw threaded stud and corresponding wing nut, said support plate being position within said unobstructed interior of said container, a screw threaded bolt and mating nut having sufficient length to project through said support plate, said container, and said support bracekt securing each to one another and securing said container to said wall partition.

8. A planter designed to be mounted upon top of a wall partition having a horizontal surface terminating in two parallel vertical surfaces comprising:
- a leakproof container having a bottom and a continuous side wall forming an unobstructed open interior, said side wall having two long portions and two short portions, each of said long portions being several times the length of each said short portions;
- two pairs of support brackets, one of said pairs of support brackets being spaced apart from the other pair of support brackets a distance less than the length of said long portion, each pair including first and second L-shaped members, said first L-shaped member being spaced apart from said second L-shaped member a distance less than the length of said short portions, each of said L-shaped members having a first leg in contact with said bottom of said container and a second leg extending perpendicularly downward from said bottom and being oriented vertically when said planter is mounted upon top of said wall partition, said first leg of each of said L-shaped members having an elongated slot therein; and
- means to fasten said container to each of said support brackets and to clamp said two parallel vertical surfaces of said wall partition tightly between said vertically depending second legs of said support brackets, said means to fasten including four screw threaded studs secured to said bottom and extending downwardly therefrom, said studs sized to be received by said elongated slots, whereby said support brackets can slidingly engage the vertical surfaces of various widths of said wall partition.

9. The combination of a wall partition and a planter designed to be mounted upon top of said wall partition, said wall partition having a horizontal surface terminating in two parallel vertical surfaces;
- said planter comprising a leakproof container having a bottom and a continuous side wall forming an unobstructed open interior, said side wall having two long portions and two short portions, each of said long portions being several times the length of each said short portions;
- two pairs of support brackets, one of said pairs of support brackets being spaced apart from the other pair of support brackets a distance less than the length of said long portions, each pair of said support brackets including first and second L-shaped members, said first L-shaped member being spaced apart from said second L-shaped member a distance less than the length of said short portions, each of said L-shaped members having a first leg in contact with said bottom of said container and a second leg extending pependicularly downward from said bottom and being oriented vertically, said first leg of each of said L-shaped members having an elongated slot therein; and
- means to fasten said container to said support bracket and to clamp said two parallel vertical surfaces of said wall partition tightly between said vertically depending second legs of said support brackets, said means to fasten including four screw threaded studs secured to said bottom and extending downwardly therefrom, said studs sized to be received by said elongated slots, whereby said support brackets can slidingly engage the vertical surfaces of various widths of said wall partition.

10. The combination of a wall partition and a planter designed to be mounted upon top of said wall partition having a horizontal surface terminating in two parallel vertical surfaces; said planter comprising a leakproof container having a bottom and a continuous side wall forming an unobstructed open interior wherein said container includes a peripheral skirt downwardly depending from said bottom and a plurality of parallel partition walls extending across the width of said container, said parallel partition walls and said peripheral skirt forming at least two recesses;
- at least one support bracket having a generally horizontal leg and a generally vertical leg, said horizontal leg having means by which said support bracket can be secured to said container; and
- means to fasten said container to said support bracket and to clamp said two parallel vertical surfaces of said wall partition tightly between said vertically depending legs of said support brackets.

11. The combination of a wall partition and a planter as claimed in claim 10, wherein said means to fasten includes a plurality of screw threaded studs formed within said recesses and corresponding wing nuts to secure said support brackets to said container.

12. The combination of a wall partition and a planter as claimed in claim 10, wherein said container includes a pair of recesses on said bottom surface so that said container sets flatly upon said horizontal surface of said wall partition except for said recesses, said recesses extending across the entire width of said container.

13. The combination of a wall partition and a planter as claimed in claim 12, wherein said means to fasten includes a plurality of screw threaded studs, each of said studs formed in one of said recesses, and including corresponding wing nuts to secure said support brackets to said container and to secure said container and support brackets to said vertical surfaces of said partition wall.

* * * * *